United States Patent
Smith

(10) Patent No.: US 12,501,388 B2
(45) Date of Patent: Dec. 16, 2025

(54) RANDOM CHANGES OF MEDIUM ACCESS CONTROL ADDRESS OF WI-FI STATION WHILE CONNECTED TO ACCESS POINT

(71) Applicant: SR Technologies, Inc., Sunrise, FL (US)

(72) Inventor: Graham K. Smith, Boca Raton, FL (US)

(73) Assignee: SR Technologies, Inc., Sunrise, FL (US)

(*) Notice: Subject to any disclaimer, the term of this patent is extended or adjusted under 35 U.S.C. 154(b) by 3 days.

(21) Appl. No.: 19/255,622

(22) Filed: Jun. 30, 2025

(65) Prior Publication Data

US 2025/0330937 A1    Oct. 23, 2025

Related U.S. Application Data

(63) Continuation of application No. 19/087,094, filed on Mar. 21, 2025, now Pat. No. 12,376,063.

(60) Provisional application No. 63/568,254, filed on Mar. 21, 2024.

(51) Int. Cl.
*H04W 60/04* (2009.01)
*H04W 8/22* (2009.01)
*H04W 12/06* (2021.01)

(52) U.S. Cl.
CPC .............. *H04W 60/04* (2013.01); *H04W 8/22* (2013.01); *H04W 12/06* (2013.01)

(58) Field of Classification Search
CPC ........ H04W 60/04; H04W 8/22; H04W 12/06
See application file for complete search history.

(56) References Cited

U.S. PATENT DOCUMENTS 12,317,190 B2 * 5/2025 Ficara ............... H04W 52/0235
2017/0013449 A1 * 1/2017 Raman ................. H04W 12/06

OTHER PUBLICATIONS

Smith, Proposed Text for Identifiable Random MAC, IRM, Oct. 2021, IEEE P802.11 Wireless LANs, doc.: IEEE 802. 11-15/0762r41673r8, pp. 10, 15-16 (Year: 2021).*

Fernandez et al., TG bh Identifiable Random MAC Address, Nov. 2021, doc.: IEEE 802. 11-21/1585r11, pp. 3-7, 10-11, 19, 21 (Year: 2021).*

* cited by examiner

*Primary Examiner* — Brandon J Miller
(74) *Attorney, Agent, or Firm* — Goodwin Procter LLP

(57) ABSTRACT

A method for operating a mobile station (STA) to periodically change its medium access control (MAC) address includes transmitting, from a STA, a first capability indication to an access point (AP) indicating that the STA supports identifiable random MAC (IRM). The STA receives a second capability indication from the AP indicating that the AP supports IRM. A first IRM address (IRMA) is determined and a first association between the STA and the AP is established using the first IRMA. A determination is made whether to change a MAC address of the STA. In response to a determination to change the MAC address of the STA, without disconnecting from the AP, a second IRMA is determined and a second association between the STA and the AP is established using the first IRMA. During the second association, the second IRMA is transmitted from the STA to the AP.

20 Claims, 10 Drawing Sheets

Management frame format

| Bit | Information | Notes |
|---|---|---|
| <ANA> | IRM Capability | The STA or AP sets IRM Capability subfield to 1 to indicate support for IRM and sets to 0 if IRM is not supported. |

IRM Capability addition to
Extended Capabilities field

IRM KDE format

IRM Element

RANDOM CHANGES OF MEDIUM ACCESS CONTROL ADDRESS OF WI-FI STATION WHILE CONNECTED TO ACCESS POINT

CROSS-REFERENCE TO RELATED APPLICATIONS

This application is a continuation of U.S. patent application Ser. No. 19/087,094, filed on Mar. 21, 2025, which claims priority to and benefit of U.S. Provisional Application No. 63/568,254, filed on Mar. 21, 2024, the entire disclosure each of which is hereby incorporated by reference.

TECHNICAL FIELD

The present disclosure relates to arrangements for addressing packets in wireless local area networks (WLANs).

BACKGROUND

Initially, it is noted that Institute of Electrical and Electronics Engineers (IEEE) Standard 802.11-2020 is used as a reference for the present disclosure, the entire contents of which is incorporated herein by reference. The IEEE 802.11-2020 Standard is commonly referred to as "Wi-Fi" and may be referred to as such or simply as the "Standard" herein. The present disclosure relates to the addressing used by devices that are based upon the IEEE 802.11 technology.

The medium access control (MAC) address of a Wi-Fi device has historically been a unique hardware address that identifies the device. However, having this MAC address openly broadcasted has meant that the device may be easily observed and tracked, without the user's permission.

FIG. 1 is a block schematic diagram of a typical IEEE 802.11 infrastructure network 100. A number of mobile stations (STAs) 120a, 120b, 120c, 120d, 120e and 120f (collectively referred to as "STAs 120") may or may not be associated with access point (AP) 110 which, in turn, is in communication with a hard-wired distribution system (DS) 130. In such a network, the AP 110 will periodically transmit beacons in order to allow the unassociated STAs 120 to locate and identify the network, and to allow the AP 110 to convey information to the associated STAs 120.

FIG. 2 depicts a format of an IEEE 802.11 Management frame 200. Frame 200 consists of a MAC Header 210, which includes Frame Control, Duration, and Address fields. In some examples, the MAC Header 210 includes optional Sequence Control information and/or High-Throughput (HT) Control fields. In some examples, the MAC header 210 includes a variable length Frame Body field 220 and a Frame Check Sum (FCS) field 230. Type and Subtype fields in the Frame Control field 212 define the function of the frame (e.g., Association Request is Type 00, Subtype 0000). In MAC Header 210, Address 1 field 215 identifies the receive address (RA) of the intended receiver of the frame, and Address 2 field 216 identifies the transmit address (TA) of the transmitter of the frame. Each address field contains a 48-bit address known as a MAC address where the Individual/Group (I/G) bit is always transmitted first, and the Universal/Local (U/L) bit is transmitted second. A MAC address where the U/L bit is set to 1 is referred to as being a "locally administered MAC address".

In order to associate to AP 110, each STA 120 may send an Association Request management frame to AP 110 with the Address 1 RA field 215 set to the MAC address of the AP 110, and the Address 2 TA field 216 set to the MAC address of the STA 120. Similarly, if the STA 120 is searching for AP 110, it may transmit Probe Request management frames, setting the Address 2 TA field 216 to the MAC address of the STA 120.

As described in the Standard (e.g., Clause 4.5.4.10), when a Wi-Fi station (e.g., STA 120) is searching for, or connects to a Wi-Fi network (e.g., AP 110), it defines the addressing of its MAC layer for that particular connection. Similarly, when a STA 120 attempts to discover services on a network before associating (i.e., preassociation), it also defines the addressing of its MAC layer. If STA 120 uses a fixed MAC address, it may be trivial to track the STA 120, and this tracking may be used to glean private and sensitive information regarding an individual behind STA 120 (e.g., the user). Furthermore, even without establishing a connection, a mobile or portable STA 120 that gratuitously transmits Probe Request frames containing service set identifiers (SSIDs) of favored networks can reveal potentially sensitive information about the STA's location and location history. To mitigate this privacy concern, a STA 120 may periodically change its MAC address prior to association.

"Requirements for support of MAC privacy enhancements" was introduced in the Standard. The Standard states that a STA 120 may periodically change its MAC address to a random value while not associated. The STA 120 shall, however, set the locally administered address bit in the MAC address. If the STA 120 is again associating with an AP with which it has been previously associated, the STA 120 is advised to change its MAC address to that used when previously associated. This latter requirement, although necessary for STA 120 to be identified, is often not adhered to.

While the introduction of MAC randomization has generally prevented the tracking of users, it has also caused problems with some network operations and "use cases" that require knowledge of an identity of a STA 120 that is returning to a particular AP or network. In other words, randomization of the MAC address can create issues. Such issues include the steering of STAs to appropriate APs/networks, parental controls, network access controls, device limits, and diagnostics. The requirement that a STA 120 uses the same MAC address every time it (re)associates to the same AP 110 does mitigate some of the issues to some extent, if followed, but this requirement still has privacy concerns. For example, a third party can easily copy the MAC address and spoof the STA 120.

One method for the identification of wireless local area network stations is termed "identifiable random MAC" (IRM). Each time STA 120 associates to AP 110, STA 120 sends a new IRM address (IRMA) to AP 110. The AP 110 may then store that IRMA as an identifier for that STA 120. The next time that STA 120 associates to that AP 110, it uses that new IRMA, provided to the AP 110 at the previous association, as the TA 216 in the Association Request management frame and association. STA 120 may indicate to the AP 110 that it is using a MAC address that is random but also "identifiable" (e.g., an IRMA). In such examples, third parties are prevented from tracking the STA 120, but a trusted AP 110 can recognize or identify the STA 120.

In addition, there is a further privacy need to protect the identity of the STA 120 and its traffic during the period that the STA 120 is connected to AP 110 by changing, at random periods, the MAC address of the STA 120. Further, in order to provide even more privacy, the individual STA 120 MAC addresses of TA 216 and RA 215 may be different and also regularly changed.

SUMMARY

In various examples, the subject matter described herein relates to arrangements for addressing packets in wireless local area networks (WLANs), and in particular, periodic changes to medium access control (MAC) addresses. According to some embodiments, a mobile station (STA) transmits a first capability indication to an access point (AP) indicating that the STA supports identifiable random MAC (IRM). The STA receives a second capability indication from the AP indicating that the AP supports IRM. A first IRM address (IRMA) is determined and a first association between the STA and the AP is established using the first IRMA. A determination is made whether to change a MAC address of the STA. In response to a determination to change the MAC address of the STA, without disconnecting from the AP, a second IRMA is determined and a second association between the STA and the AP is established using the first IRMA. During the second association, the second IRMA is transmitted from the STA to the AP.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

A more complete understanding of the present disclosure, and the attendant advantages and features thereof, will be more readily understood by first discussing several methods of identifiable random medium access control (MAC) (IRM). IRM refers to an arrangement where a STA 120 uses identifiable random MAC addresses (IRMAs) to prevent third parties from tracking the non-AP STA 120 while still allowing trusted parties to identify the STA 120. Likewise, an IRMA refers to a randomized MAC address used by a STA 120 using IRM.

In a first IRM method ("Method A"), STA 120 provides an IRMA to AP 110 when it associates. The next time that STA 120 associates to AP 110, STA 120 uses the IRMA as its transmit address (TA) 216 and hence is identifiable. In a second IRM method ("Method B"), STA 120 uses IRM to change its MAC address at any time during the period that the STA 120 is connected to the AP 110. In a third IRM method ("Method C"), STA 120 uses a 96 bit IRMA to provide independent TA 216 and receive address (RA) 215 addresses and to change them at any time during the period that the STA 120 is connected to AP 110.

Figure 1:
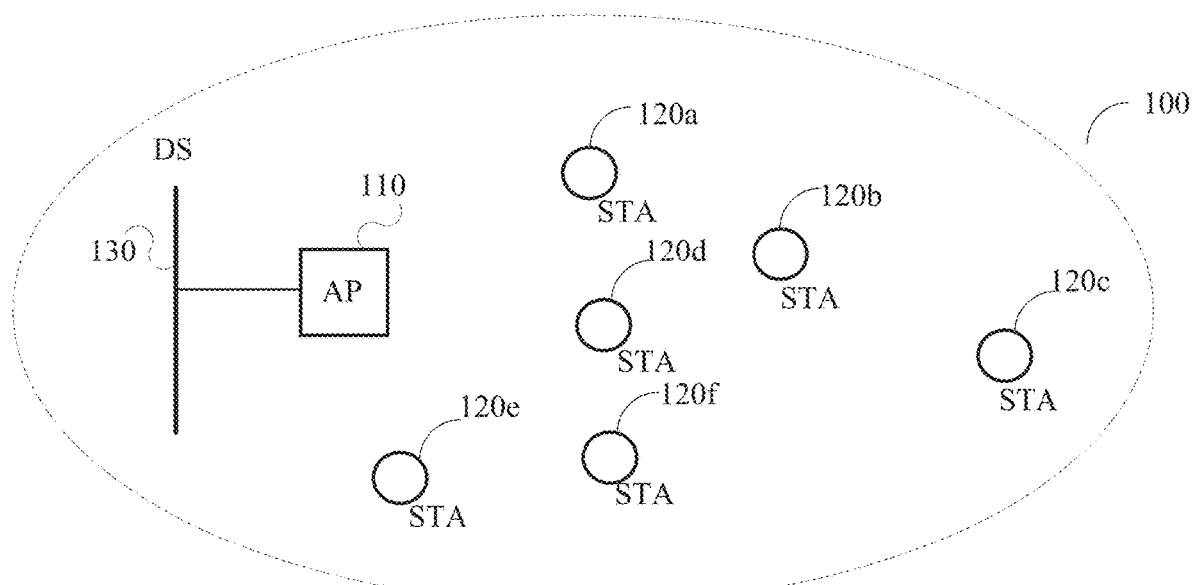
FIG. 1 is a block schematic diagram of a typical IEEE 802.11 infrastructure network, in accordance with some embodiments.
Figures 2, 3:
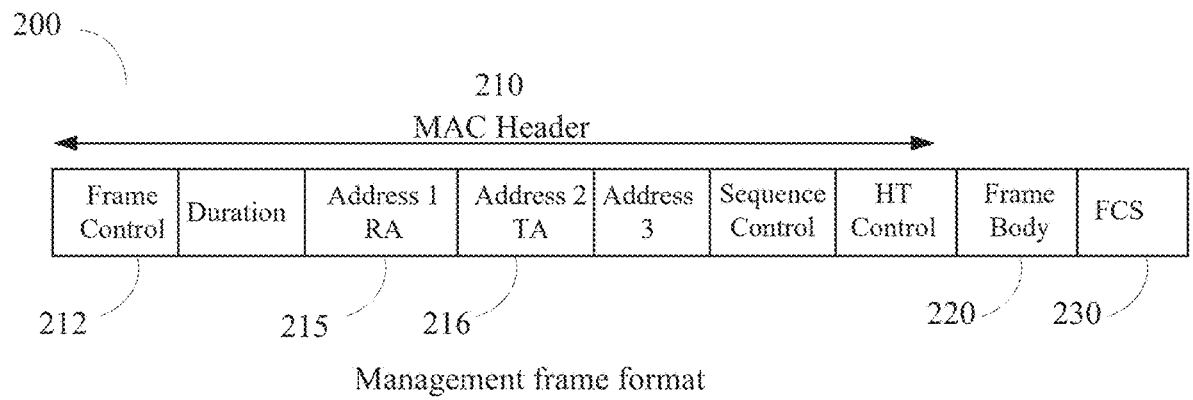
FIG. 2 depicts a format of an IEEE 802.11 Management frame, in accordance with some embodiments.
FIG. 3 depicts an example of a Capability bit that may be added to an Extended Capabilities Information element, in accordance with some embodiments.

FIG. 3 depicts an example of a capability bit 300 that may be added to the Extended Capabilities Information element. In some examples, the capability bit 300 is an IRM Capability bit. An AP 110 may include the IRM Capability bit 300 in the Extended Capabilities Information element or in the Extended robust secure network (RSN) Capabilities field in its beacons to indicate that the AP 110 supports IRM. In some examples, the capability bit 300 is an element included in the beacon frame body. A STA 120 may include the IRM Capability bit 300 in the Extended Capabilities Information element or in the Extended RSN Capabilities field in its Association Request frame to indicate that the STA 120 supports IRM. The position of the bit in the Extended Capabilities Information element is assigned by the 802.11 Working Group Assigned Numbers Authority (ANA). Setting the bit to '0', or omitting the bit, indicates that IRM is not supported.

In Method A, described above, a STA 120 may advertise support for IRM by setting the IRM Capability bit 300 to '1' in the Extended Capabilities element, or in the Extended RSN Capabilities field in the Probe Request and Association Request frames. An AP 110 may advertise support for IRM by setting the IRM Capability bit 300 to '1' in the Extended Capabilities element, or in the Extended RSN Capabilities field in its Beacon and Probe Response frames.

Each time the STA 120 associates to the AP 110, the STA 120 provides a new IRMA to the AP 110. The AP 110 can then store that IRMA as an identifier for the STA 120. The next time the STA 120 associates to the AP 110, it uses the new IRMA, provided to the AP 110 at the previous association, as the TA 216 in the Association Request frame and association.

A list of IRMAs and STAs 120 may be stored by the AP 110 and used as an identifier for each STA 120 that has previously been associated. A STA 120 may store the last IRMA exchanged with a particular AP 110 such that the next time the STA 120 associates to that AP 110, the AP 110 can identify the STA 120.

If STA 120 is associating using an IRMA, then AP 110 may search a stored list of STAs and IRMAs for STAs that had previously associated. If the STA 120 had previously associated to AP 110, the AP 110 matches the respective IRMA to the TA 216 being used by STA 120 and hence identifies the STA 120. If STA 120 had not previously associated to AP 110 (e.g., this is the first time for an association), then AP 110 may wait until STA 120 associates and provides an IRMA which AP 110 may store for the next time STA 120 associates.

Figure 4:
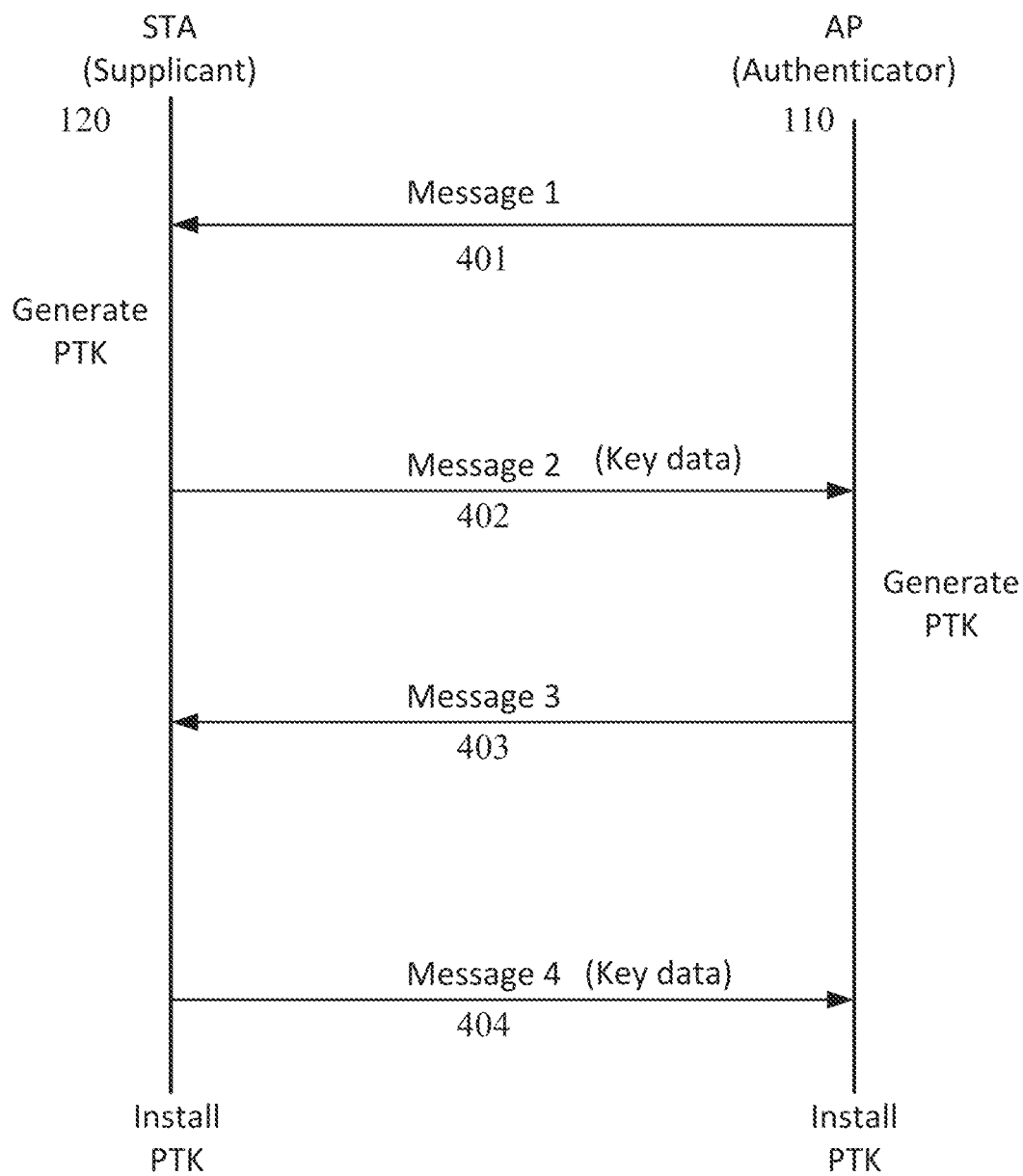
FIG. 4 is a diagram of an example message exchange flow during a four-way handshake that occurs when a mobile station (STA) associates with an access point (AP), in accordance with some embodiments.

FIG. 4 is a diagram illustrating an example message exchange flow during a four-way handshake that occurs when a STA 120 associates with the AP 110 using robust secure network association (RSNA). The four-way handshake is specified in detail in the Standard, hence only an outline of the procedure is described herein. Both the STA 120 and the AP 110 share a pairwise master key (PMK) (i.e., the network "password"). The handshake starts when AP 110 sends Message 1 401 to STA 120, which STA 120 uses to generate a pairwise transient key (PTK). STA 120 then sends Message 2 402 to AP 110 with information such that AP 110 can also generate the PTK. AP 110 then sends Message 3 403 containing the group temporal key (GTK) to STA 120. Message 4 404 is sent by STA 120 to AP 110 to confirm that the keys, PTK and GTK, have been installed. In Message 2 402 and/or Message 4 404, the STA 120 may include a field which is a variable length field used to include additional data. This key data encapsulation (KDE) field is protected and may be used by STA 120 to send a new IRMA to AP 110.

Figure 5:
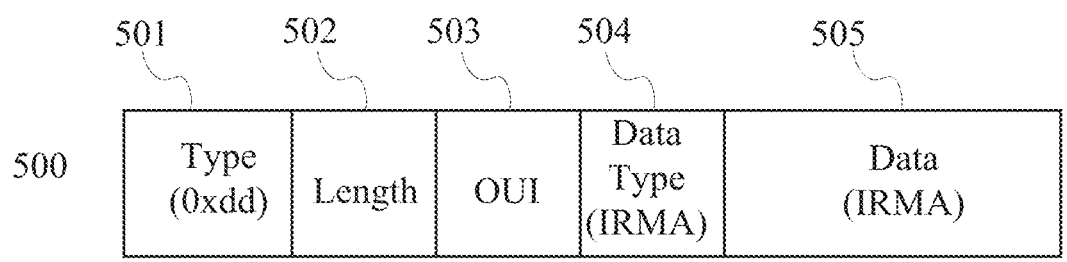
FIG. 5 depicts an example of a key data encapsulation (KDE) format, in accordance with aspects described herein.

FIG. 5 depicts an example of a KDE format 500. In some examples, the KDE format 500 is an IRM KDE format. The Type field 501 is set to "0xdd" as specified in the Standard for KDEs. The Length field 502 specifies the number of octets in the following fields 503, 504 and 505. As specified in "Table 12-9-KDE selectors" in the Standard, the organizationally unique identifier (OUI) field 503 is set to "00-OF-AC". The data type field 504 is used to define the meaning of the KDE 500. A new data type may be assigned with associated meaning "IRMA" (i.e., a new data type may be added to Table 12-9-KDE selectors in the Standard). In the case that the KDE 500 is used for the allocation of the IRMA, then the data type field 504 is set to a value that indicates this is an IRM KDE and the IRMA field 505 contains the new IRMA (i.e., a random, locally administered MAC address, of 48 bits).

Figure 6:
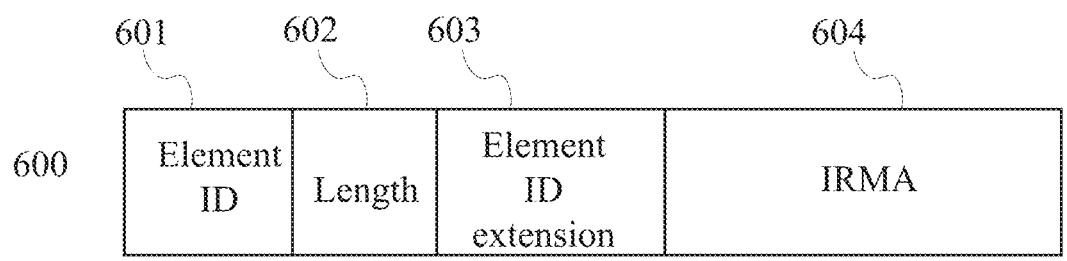
FIG. 6 depicts an example of an information element format, in accordance with some embodiments.

FIG. 6 depicts an example of an information element format for an IRM element 600. In some examples, the Element ID 601 has a value of "255". The Length field 602 specifies the number of octets in the following fields 603, 604. The Element ID extension field 603 value is allocated for the new IRM element. Field 604 contains the new IRMA (i.e., a random MAC address of 48 bits). When using fast initial link setup (FILS) authentication, the IRM element 600 is included in the Association Request frame. FILS is described in greater detail in the Standard.

Once STA 120 has associated to AP 110, in order to improve privacy, the STA 120 may decide to change its MAC address. Furthermore, the STA 120 may decide to change its MAC address several times during the period that it is connected to the AP 110. In the case that there are several STAs 120 connected to the AP 110, various options may be considered for changing the MAC addresses of the STAs 120. For example, AP 110 may transmit a command for all the STAs 120 to change their MAC addresses at a certain, fixed time. This scheme would certainly provide increased privacy as any listener would not be able to distinguish one STA from another. However, if a STA 120 is busy (e.g., in a video call), it may not be suitable for that particular STA 120 to change its MAC address at that fixed time and interrupt its traffic. In addition, if traffic is flowing to and from a particular STA 120, there would be a transition period when the old and new MAC addresses would both have to be in use. Finally, for such a scheme to work, both the AP 110 and the STA 120 need to know what the new MAC address will be. Hence, it may be required that a key is exchanged on the first association and a computational function is used such that both the AP 110 and the STA 120 can calculate the new MAC address. In addition, if the MAC address is changed, then it is necessary to also change the associated identity (AID). The AID is provided, in the Association Response, by the AP 110 to a STA 120 when the STA 120 associates. If the AID is not also changed when the MAC address is changed, then it may be trivial to still identify that it is the same STA 120. Allocating new AIDs using, for example, a computational function based on a key is problematic as there are only 2007 possible AIDs and any pseudo random method to allocate new AIDs, in a busy network, would be prone to duplicates. Also, during any changeover period when, dependent upon traffic, both the old and new MAC addresses are in use, the simultaneous use of the old and new AIDs would be required, and this severely restricts the number of STAs 120 that the AP 110 may have associated with it.

Another possible option is that the STAs 120 choose their own time for changing their MAC address. The STA 120 may choose a time when it is convenient to change (e.g., a period when the STA 120 is not in a busy traffic situation). In this case, the STA 120 would need to indicate to the AP 110 that it is changing its MAC address and both the AP 110 and the STA 120 need to know what the new address is. However, in this case, a listener might detect that one MAC address has stopped and another started and hence it is not too difficult to distinguish that STA 120. To overcome this, the STA 120 may need to send authentication and/or association frames such that a listener would observe, over time, many new STAs 120 joining the network and it would then be difficult to distinguish which STA 120 was changing its MAC address. Again, for such a scheme to work, both the AP 110 and the STA 120 need to know what the new MAC address will be in advance and again may require that (i) a key is exchanged or derived on a first association and (ii) a function is used such that both can calculate the new address. In this case, the AP 110 may allocate a new AID in an Association Response.

Several other options and variations are possible in view of the arrangements and methods described herein with either the AP 110 and/or the STA 120 initiating the address change together with methods for computing the new addresses.

It may be noted that in the general sense, the STA 120 is the device that requires privacy. The timing and frequency of a MAC address change when a STA 120 is connected to an AP 110 is better if it is the decision of the STA 120 (i.e., the STA 120 should be able to choose when to change its MAC address, based upon criteria such as network traffic and user traffic).

In Method A, as discussed above, STA 120 only changes its MAC address when it disconnects from the AP 110, then returns and associates again with the AP 110.

In Method B, discussed above, IRM is used by the STA 120 to change its MAC address while remaining connected to the AP 110 in order to add privacy to the STA 120 and its traffic. In this second IRM method, the STA 120 may initially associate to the AP 110 and provide an IRMA, but then STA 120 may choose a time when to change its MAC address, e.g., a time when its usage is low or not critical to delay or interruption, but such that STA 120 does not disconnect from AP 110. The STA 120 stays connected to the AP 110 but effectively associates again (i.e., authenticate, associate) using the IRMA it provided at the first or previous association, and provides a new IRMA in either the four-way handshake or, in the case of FILS, in the Association Request. Note that STA 120 does not 'reassociate' (i.e., send a Reassociation Request frame) as a 'reassociation' is typically used when reassociating to another AP in the same extended service set (ESS), and as described in the Standard, reassociation requires that the STA 120 uses the same MAC address as before. Additionally, it should be noted that by sending a new Association Request, the STA 120 does not need to lose contact with the AP 110. During the association, when the STA 120 changes its MAC address, the AP 110 will provide a new AID to the STA 120. In order to improve privacy, because AP 110 has already identified the STA 120, the STA 120 may choose to omit many of the information elements (IEs) from the Association Request such that its fingerprint is lowered. For example, the STA 120 may omit vendor specific IEs as the AP 110 has previously identified the STA 120 and its associated information may be retained.

In Method C, discussed above, in order to add more privacy to the STA 120, when connected to AP 110, the STA 120 may use different MAC addresses for transmitted packets and for receiving packets. For example, the STA 120 transmits packets to the AP 110 using 'address A' as the TA 216, and the AP 110 transmits packets to the STA 120 using 'address B' as the RA 215. It must be noted, however, that in order to prevent a listener from coupling the two addresses, response Control packets such as acknowledge (ACK), clear-to-send (CTS), and block ACK (BA), need to be sent using the same RA as the received TA, otherwise, it would be simple for a listener to match, for example, the RA in the ACK sent by the AP 110, to a different TA in a data packet sent by the STA 120.

In Method C, the IRM method is expanded to support dual MAC addresses. In the IRM KDE 500 of FIG. 5 and the IRM element 600 of FIG. 6, the IRMA fields 505 and 604 respectively, may be expanded from 48 to 96 bits to provide two random MAC addresses (e.g., the first 48 bits being 'address A' and the last 48 bits being 'address B'). AP 110 and STA 120 may indicate support for this dual IRMA scheme with a new capability "IRM dual capability" added to the Extended Capabilities field similar to that discussed above for 'IRM Capability' bit 300 in FIG. 3.

Figure 7:
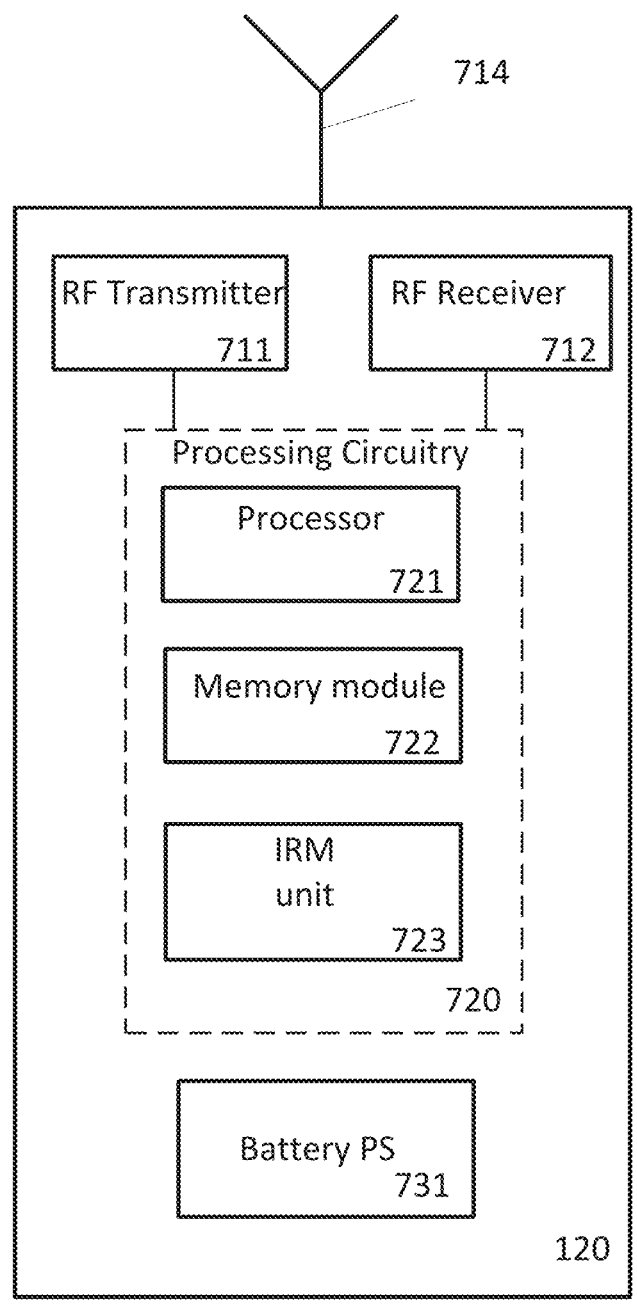
FIG. 7 depicts an example of a STA, in accordance with some embodiments.

FIG. 7 illustrates an example of a STA 120, according to some embodiments of the present disclosure. STA 120 may be a wireless device or a mobile station that is based upon the IEEE 802.11 Standard. In some examples, the STA 120 includes an antenna assembly 714, a radio frequency (RF) receiver 712, an RF transmitter 711, processing circuitry 720, and a battery powered power supply (PS) 731. The antenna assembly 714 may include several antennas such that the STA 120 may transmit and receive signals in the various frequency bands covered by the 802.11 Standard and enable features such as multiple input multiple output (MIMO) and beamforming. The RF receiver 712 may receive RF signals from the antenna assembly 714. The RF receiver 712 may include one or more receiver paths. The RF receiver 712 may perform the usual functions of an RF receiver such as low noise amplification, filtering, and frequency down conversion, so as to condition the received signal suitable for inputting to the processing circuitry 720. The processing circuitry 720 may perform the usual baseband functions such as demodulation, descrambling, and error correction of received packets as described in the Standard, and may also perform the functions required by IRM for the STA 120 as described in this disclosure. The RF transmitter 711 may include one or more transmitter paths. The RF transmitter 711 may perform the usual functions of an RF transmitter such as up conversion, filtering, and power amplification of the baseband signal received from the processing circuitry 720. The processing circuitry 720 may perform the usual baseband functions such as coding, scrambling, and modulation of packets to be transmitted as described in the Standard.

The processing circuitry 720 may include a processor 721, a memory 722, and the IRM unit 723. In addition to a traditional processor and memory, processing circuitry 720 may include integrated circuitry for processing and/or control (e.g., one or more processors, processor cores, Field Programmable Gate Arrays (FPGAs), and/or Application Specific Integrated Circuitry (ASICs)). Processor 721 may be configured to access (e.g., write to and/or read from) memory 722, which may include any kind of volatile and/or non-volatile memory (e.g., cache memory, buffer memory, Random Access Memory (RAM), Read-Only Memory (ROM), optical memory, and/or Erasable Programmable Read-Only Memory (EPROM)). Memory 722 may be configured to store code executable by processor 721 and/or other data (e.g., data pertaining to communication, configuration and/or address data of nodes, etc.).

Processing circuitry 720 may be configured to control any of the methods and processes described herein, or to cause such methods and processes to be performed (e.g., by the STA 120). Corresponding instructions may be stored in memory 722 and/or in the IRM unit 723, which may be readable and/or readably connected to processor 721. In other words, processing circuitry 720 may include a microprocessor, microcontroller, FPGA device, and/or an ASIC device. The IRM unit 723 may be configured to perform any of the processes described herein, such as determining values for use as IRMAs and writing to memory 722 for the storage of the allocated IRMAs and their corresponding APs.

Figure 8:
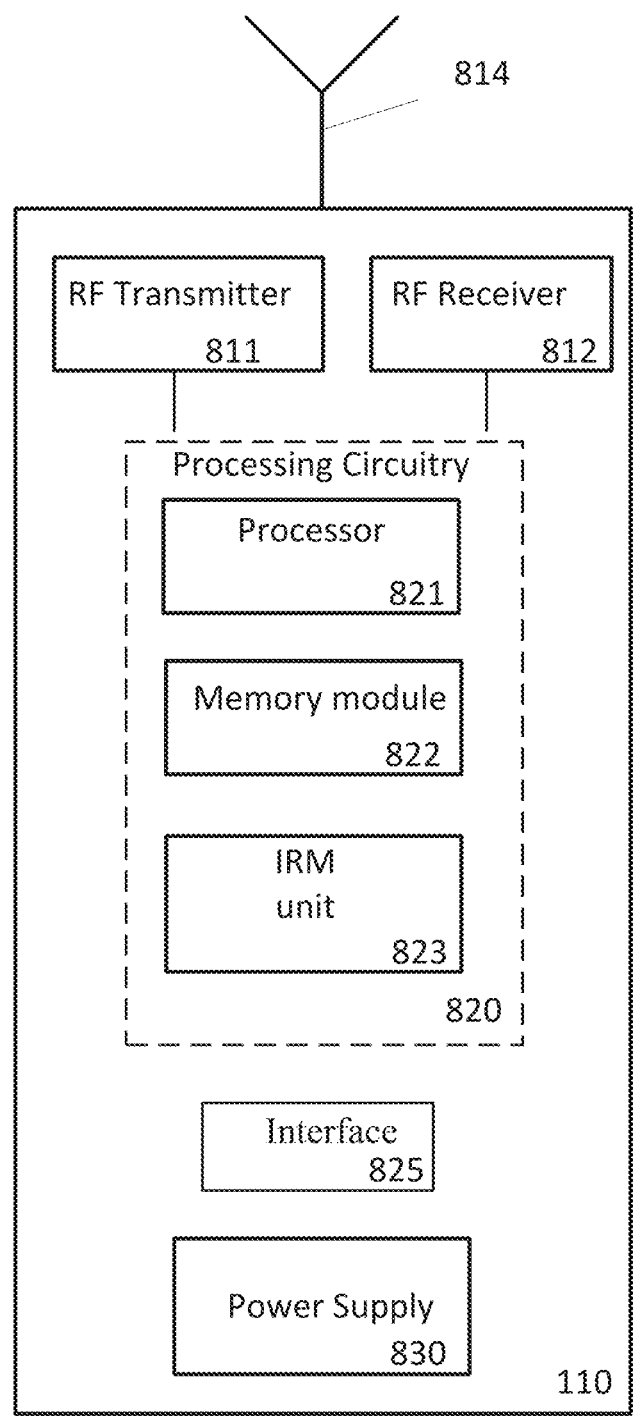
FIG. 8 depicts an example of an AP, in accordance with some embodiments.

FIG. 8 illustrates an example of an access point AP 110, according to some embodiments of the present disclosure. The AP 110 may be a wireless device that is based upon the IEEE 802.11 Standard. In some examples, the AP 110 includes an antenna assembly 814, an RF receiver 812, an RF transmitter 811, processing circuitry 820, an interface 825, and a power supply 830. Interface 825 may connect the processing circuitry 820 via Ethernet to the DS 130. Antenna assembly 814 may comprise several antennas such that the AP 110 may transmit and receive signals in the various frequency bands covered by the 802.11 Standard and enable features such as multiple input multiple output (MIMO) and beamforming. The RF receiver 812 may receive RF signals from the antenna assembly 814. The RF receiver 812 may include one or more receiver paths. The RF receiver 812 may perform the usual functions of an RF receiver such as low noise amplification, filtering, and frequency down conversion, so as to condition the received signal suitable for inputting to the processing circuitry 820. The processing circuitry 820 may perform the usual baseband functions such as demodulation, descrambling, and error correction of received packets as described in the Standard and may also perform the functions required by an AP 110 for IRM as described in this disclosure. The RF transmitter 811 may include one or more transmitter paths. The RF transmitter 811 may perform the usual function of an RF transmitter such as up conversion, filtering, and power amplification of the baseband signal received from the processing circuitry 820. The processing circuitry 820 may perform the usual baseband functions such as coding, scrambling, and modulation of packets to be transmitted as described in the Standard.

The processing circuitry 820 may include a processor 821, a memory 822, and an IRM unit 823. In addition to a traditional processor and memory, processing circuitry 820 may comprise integrated circuitry for processing and/or control (e.g., one or more processors, processor cores, FPGAs, and/or ASICs. Processor 821 may be configured to access (e.g., write to and/or read from) memory 822, which may include any kind of volatile and/or non-volatile memory (e.g., cache memory, buffer memory, RAM, ROM, optical memory, and/or EPROM). Such memory 822 may be configured to store code executable by processor 821 and/or other data (e.g., data pertaining to communication, configuration, and/or address data of nodes, etc.).

Processing circuitry 820 may be configured to control any of the methods and processes described herein, or to cause such methods and processes to be performed (e.g., by the AP 110). Corresponding instructions may be stored in memory 822 and/or IRM unit 823, which may be readable and/or readably connected to processor 821. In other words, processing circuitry 820 may include a microprocessor, microcontroller, FPGA device, and/or ASIC device. The IRM unit 823 may be configured to perform any of the processes described herein, such as searching memory 822 for a stored IRMA and writing to memory 822 for the storage of the allocated IRMAs and their corresponding STAs.

It should be appreciated that the modules discussed herein may be implemented in hardware or a combination of hardware and software. For example, the modules may be implemented by a processor executing software instructions or by application specific integrated circuitry configured to implement the functions attributable to the modules. Also, it should be appreciated that the term "connected to" as used herein refers to "being in communication with" and is not intended to necessarily mean a physical or direct connection. It is contemplated that the signal path between one element and another may traverse multiple physical devices.

Thus, in some examples, the processing circuitries 720 and 820 of FIGS. 7 and 8 may include the processors 721 and 821 and the memories 722 and 822 containing instructions which, when executed by the processors 721 and 821 respectively, configure the processor 721 or 821 to perform the one or more functions described herein. Similarly, in some examples, the processing circuitries 720 and 820 may include the IRM units 723 and 823 and the memories 722 and 822 containing instructions which, when executed by the IRM units 723 and 823 respectively, configure the processor 721 or 821 to perform the one or more functions described herein. In addition to a traditional processor and memory, the processing circuitries 720 and 820 may include integrated circuitry for processing and/or control (e.g., one or more processors, processor cores, FPGAs, and/or ASICs).

The processors 721 and 821 may include, be connected to, or be configured for accessing (e.g., writing to and/or reading from), the memories 722 and 822, respectively. Such memories 722 and 822 may be configured to store code executable by control circuitry and/or other data (e.g., data pertaining to communication, configuration, and/or address data of nodes, etc.). The processing circuitry 720 and 820 may be configured to control any of the methods described herein, or to cause such methods to be performed (e.g., by the processors 721 and 821 or by the IRM units 723 and 823). Corresponding instructions may be stored in memory 722 or 822, which may be readable and/or readably connected to the processing circuitry 720 or 820. In other words, the processing circuitries 720 and 820 may include a controller, which may include a microprocessor, microcontroller, FPGA device, and/or ASIC device. It may be considered that the processing circuitries 720 and 820 include, or may be connected or connectable to, memory, which may be configured to be accessible for reading and/or writing by the controller and/or processing circuitry 720 or 820.

According to an embodiment of the disclosure, STA 120 is configured to receive transmissions of another wireless device, such as AP 110. In some examples, the processing circuitry 720 is configured to monitor attributes of those transmissions. For example, the processing circuitry 720, or the IRM unit 723, may be arranged to monitor attributes of beacon transmissions of AP 110 and determine that AP 110 supports IRM by examination of the Extended Capabilities field in the beacon transmissions and determining that the IRM capability bit is set therein. In some examples, STA 120 transmits to AP 110 an Association Request frame and AP 110 monitors the Association Request frame from STA 120. The processing circuitry 820 in AP 110 may be configured to check through stored IRMAs to find the IRMA that matches the TA 216 (i.e., IRMA) in the Association Request sent by STA 120. Similarly, the memory 722 in STA 120 may be configured to store the IRMAs that it provided when last associating to each AP 110.

According to an embodiment of the disclosure, STA 120 and AP 110 are configured to carry out the function of association, as described in the Standard, and to carry out the four-way handshake as discussed above with reference to FIG. 4 and FILS as discussed with reference to FIG. 5. In some examples, STA 120 inserts an IRMA KDE frame 500 into Message 2 402 or Message 4 404 of the four-way handshake. In some examples, AP 110 is configured to recognize and decode the IRMA KDE frame 500 and, in particular, the IRMA field 505. This recognition and decoding may take place in the IRM unit 723. In some examples, STA 120, when using FILS authentication, inserts an IRM element 600 into the Association Request.

Figure 9:
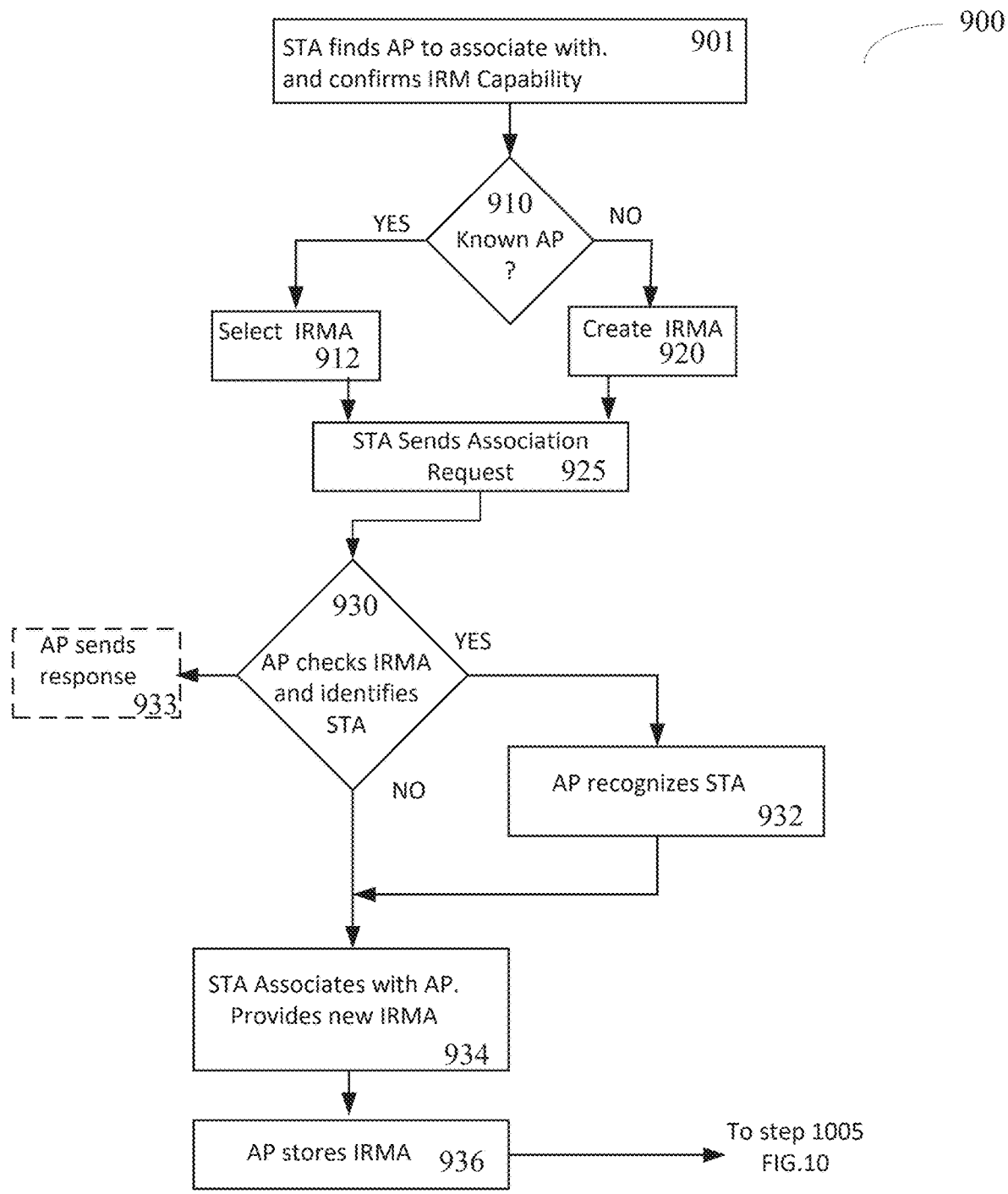
FIGS. 9 and 10 depict a flow diagram of a method for changing a medium access control (MAC) address of a STA, in accordance with some embodiments.
Figure 10:
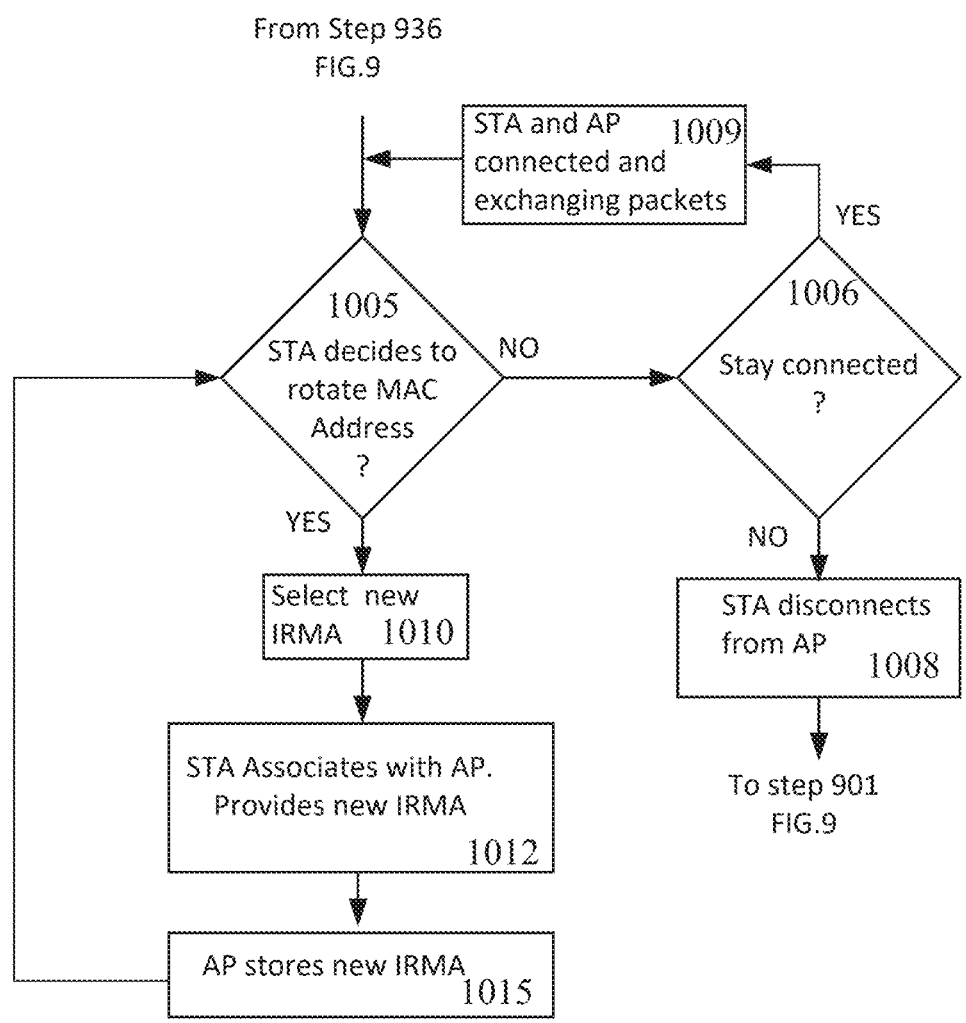

FIGS. 9 and 10 represent an example flow diagram of a method 900 in accordance with aspects described herein. In the method 900, both STA 120 and AP 110 have set the IRM Capability bit 300 in their Extended Capabilities fields as discussed above with reference to FIG. 3. The method 900 starts with step 901, where STA 120 receives beacons from AP 110, checks the attributes and decides to associate. At step 910, STA 120 checks if AP 110 is an AP that STA 120 has previously associated to and has previously provided an IRMA to (i.e., whether AP 110 is known to STA 120). If yes, then step 910 is followed by step 912 where STA 120 selects the IRMA that it provided to AP 110 during its last association. STA 120 may store a list of APs and IRMAs in memory 722, and IRM unit 723 may be configured to search through that list to determine if AP 110 and an associated IRMA is present.

If, at step 910, STA 120 determines that AP 110 is an AP that STA 120 has not previously associated with and has not previously provided an IRMA to, then at step 920, STA 120 creates an IRMA that is used as an identifier for STA 120 with AP 110. For example, STA 120 may store a list of APs and IRMAs in memory 722, and IRM unit 723 may be arranged to search through that list to determine that an IRMA for AP 110 is not present. The new IRMA may be created by the IRM unit 723 in processing circuitry 720.

Steps 912 or 920 are followed by step 925, where STA 120 sends an Association Request frame to AP 110. In some examples, the Association Request frame follows an authentication or a FILS authentication. The Association Request frame may be constructed by processing circuitry 720 and then transmitted via RF transmitter 711 and antenna assembly 714. At step 930, AP 110 receives the Association Request frame from STA 120 and checks through its list of IRMAs and STAs in order to find a stored IRMA that matches the TA 216 in the Association Request frame. If a match is found, then, at step 932, AP 110 has identified or recognized STA 120. IRM unit 823 in processing circuitry 820 may be configured to search a list of IRMAs and STAs stored in memory 822. At step 934, STA 120 may continue the association with AP 110. STA 120 is configured to include an IRMA KDE 500 that includes a new IRMA field 505 in Message 2 402 or Message 4 404 of the four-way handshake of FIG. 4. If using FILS authentication, STA 120 is configured to include an IRM element 600 that includes a new IRMA field 604. At step 936, AP 110 stores the new IRMA, received at step 934, in memory module 822. If at step 930, AP 110 checks through its list of IRMAs and STAs and does not find a stored IRMA that matches the TA 216 in the Association Request frame, then the process advances to step 934. At step 933, AP 110 may send a response, after step 930, to STA 120 informing it that it has been identified or not. This response may be sent in Message 3 403 of FIG. 4, or the Association Response frame if FILS is being used. After step 936, the method advances to FIG. 10 step 1005.

At step 1005, STA 120 decides whether to rotate its MAC address. Such a decision may be based upon a number or combination of criteria such as: elapsed time since association or last MAC address rotation, local device traffic and usage, and/or network traffic and loading. For example, the decision to change the MAC address may be made once a predetermined time period has lapsed since the last address change (e.g., 30 secs, 5 mins, 1 hr, etc.). Likewise, the decision to change the MAC address may be made once there is a pause in local device traffic (e.g., when there is no active local traffic, such as a video, audio, or phone call). In some examples, a pause in local device traffic corresponds to an interruptible state of the STA 120. In some examples, the IRM unit 723 in processing circuitry 720 contains a program/algorithm for this decision to rotate the MAC address. If the STA 120 is not ready to rotate the MAC address, then at step 1006, it checks whether to remain connected to the AP 110. If it decides to disconnect, then at step 1008, it does so, and the method returns to FIG. 9 step 901. This disconnection may simply be that the STA 120 has drifted outside the coverage area of AP 110 as determined by RF receiver 712. In the general sense, STA 120 will stay connected, and at step 1009, STA 120 and AP 110 remain connected and exchange packets. At step 1005, STA 120 checks, at some predetermined interval, whether the conditions are right for the STA 120 to enact a MAC address rotation under the control of IRM unit 723 in processing circuitry 720.

If, at step 1005, STA 120 decides to change or rotate the MAC address, then at step 1010, a new IRMA is created. In some examples, the new IRMA is created by IRM unit 723. At step 1012, STA 120 performs an association with AP 110 using the IRMA that was provided to AP 110 at step 934. Hence, AP 110 identifies STA 120 and knows that it is the same STA. If using the four-way handshake, as discussed above with reference to FIG. 4, the new IRMA, created in step 1010, is contained in the IRM KDE 500 and transmitted to AP 110 in Message 4 404. It should be appreciated that the IRM KDE 500 may alternatively be transmitted in Message 2 402. In some examples, the decision as to which Message to use, 2 or 4, is a standardization/interoperability decision. If using FILS authentication, then the new IRMA is contained in the IRM element and transmitted to AP 110 in the Association Request frame. As part of the association process, AP 110 will provide a new AID to STA 120. The association procedure is carried out by the RF transmitter 711 and RF receiver 712 in STA 120 and by the RF receiver 812 and RF transmitter 811 in AP 110, as controlled by the respective processing circuitries 720 and 820. At step 1015, similar to step 936, AP 110 stores the new IRMA, provided by STA 120 in step 1012, in memory module 822. The method then returns to step 1005.

In the method 900 discussed above with reference to FIGS. 9 and 10, both STA 120 and AP 110 advertise that they support IRM, and STA 120 initially associates to AP 110 using a random MAC address. During that initial association, STA 120 provides an IRMA to AP 110 and AP 110 stores that address. At a certain time, that is decided by STA 120 while remaining connected to AP 110, STA 120 initiates a new association to AP 110. In that association, STA 120 uses the IRMA that was provided at the last association as its TA such that AP 110 recognizes STA 120 and knows it is the same STA. AP 110 will also provide a new AID to STA 120 at each association. STA 120 may decide to initiate a new association several times while it is connected to AP 110, each time using the IRMA provided at the previous association as its TA and providing a new IRMA during the association. Hence, in the general case that several STAs are connected to AP 110, a listener would observe many STAs associating at random times, all with different MAC addresses. In such a scenario, a listener would be unable to distinguish which STA is which, hence increasing the privacy for each STA that is using this IRM method. As STA 120 is recognized by AP 110, the information elements (IEs) in the Association Request frame may be kept to a minimum such that STA 120 is not providing details that may be used by a listener to identify the STA. For example, in the initial association, STA 120 may include a vender specific IE, but on subsequent associations, this may be omitted.

The steps of method 900 that are depicted in FIG. 9 relate to the first IRM method (i.e., Method A) where STA 120 associates using a previously provided IRMA and provides one new IRMA. In this first IRM method, STA 120 keeps the same TA that it used to associate throughout the time that it is connected to AP 110. Only if STA 120 disconnects from AP 110, returns, and then associates again with AP 110, does STA 120 change its MAC Address (i.e., IRMA).

Figure 11:
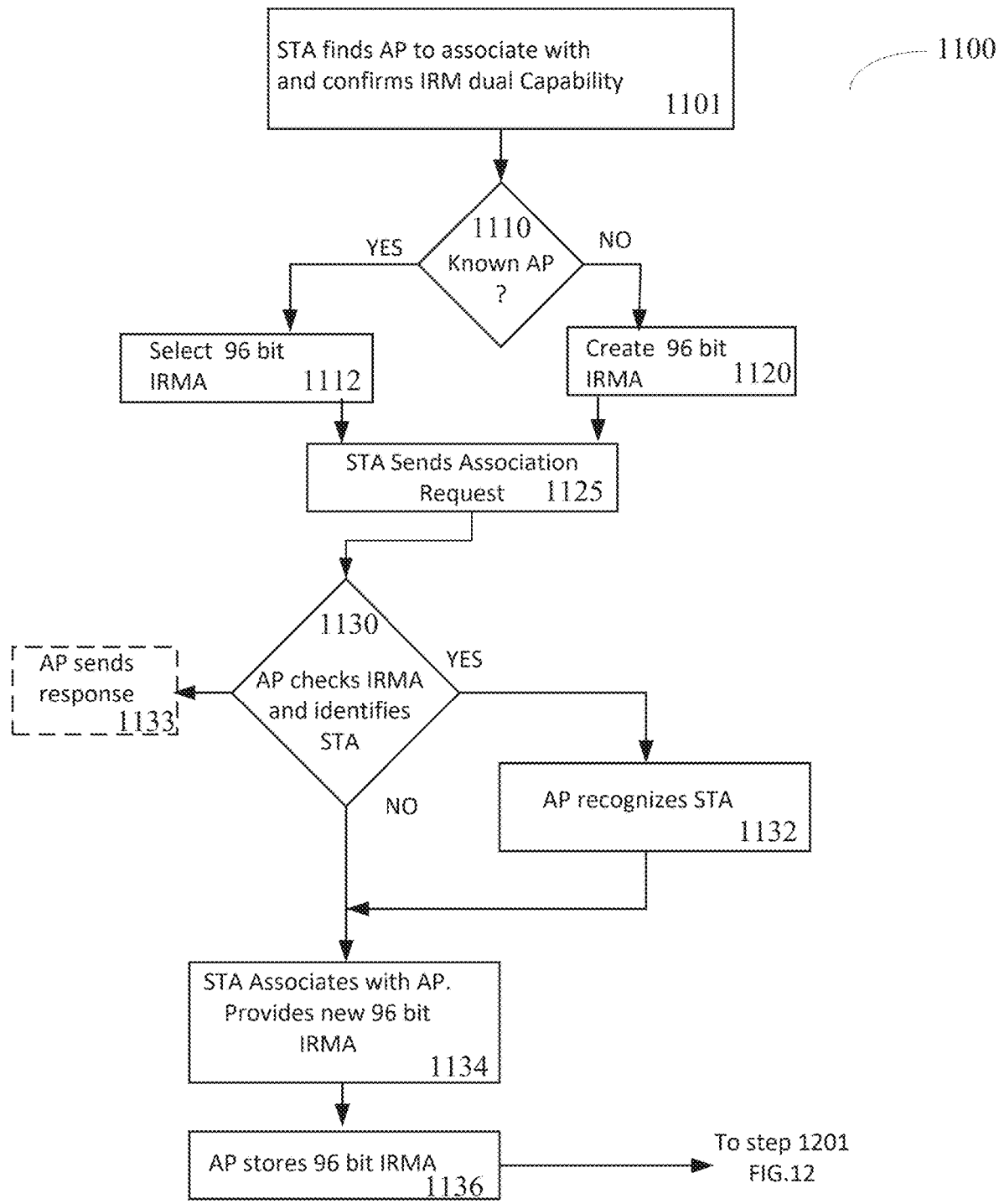
FIGS. 11 and 12 depict a flow diagram of a method for changing a MAC address of a STA, in accordance with some embodiments.
Figure 12:
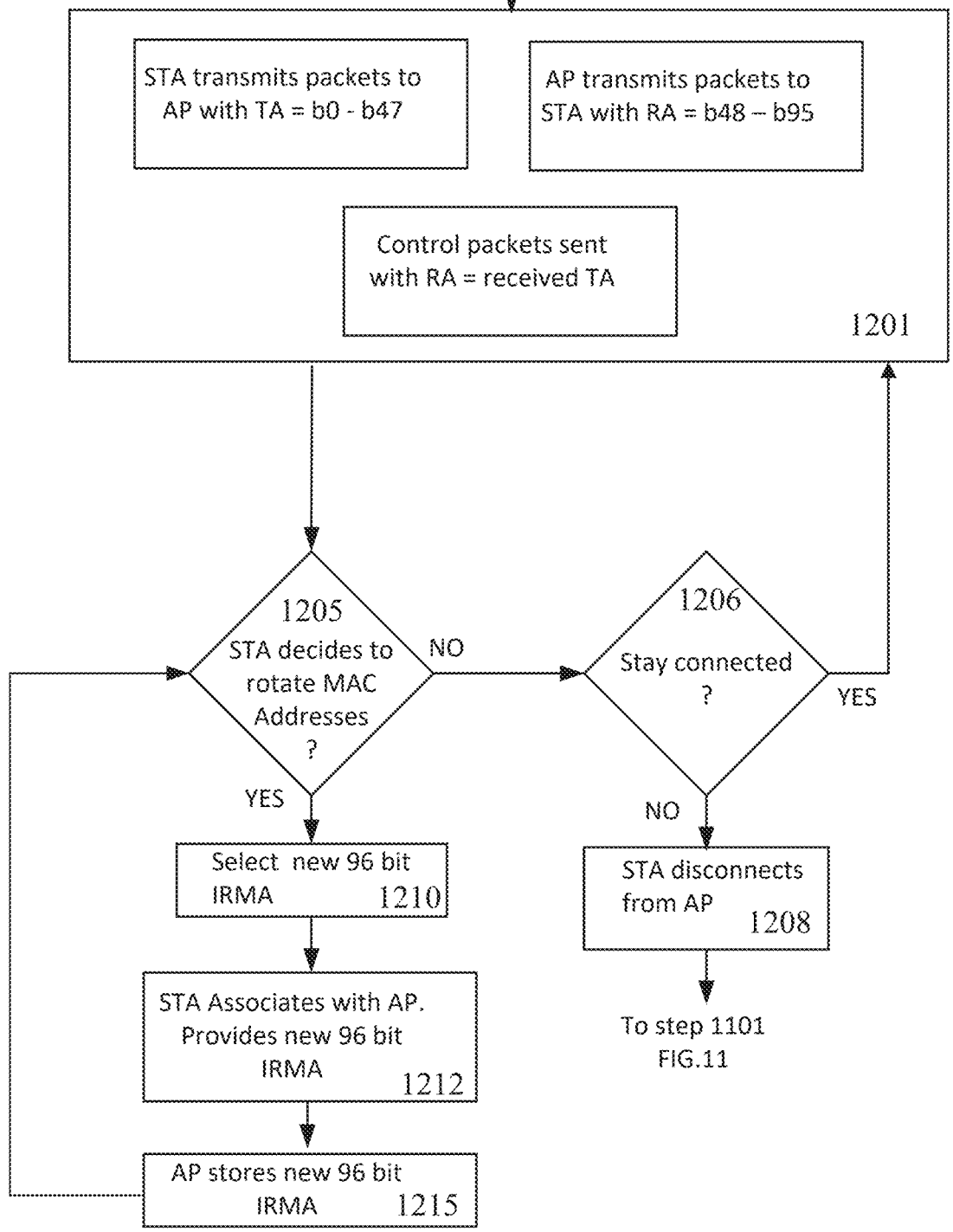

FIGS. 11 and 12 represent a flow diagram of a method 1100 in accordance with aspects described herein. In some examples, method 1100 enables a STA 120 to use independent TA and RA addresses and to change them at any time during the period that the STA 120 is connected to the AP 110. Method 1100 is similar to method 900, but in method 1100, both STA 120 and AP 110 have set a IRM dual Capability bit in their Extended Capabilities fields. Hence, the IRMA is expanded to 96 bits. The first 48 bits are used by STA 120 as the TA 216 to transmit packets and the second 48 bits are used by AP 110 as the RA 215 to transmit packets to STA 120. In some examples, Response Control packets are sent by AP 110 and STA 120 using as the RA, the TA of the received packet.

Method 1100 starts with step 1101, where STA 120 receives beacons from AP 110, checks the attributes and decides to associate (i.e., AP 110 and STA 120 are both advertising support for IRM dual capability). At step 1110, STA 120 checks if AP 110 is an AP that STA 120 has previously associated with and has previously provided a 96 bit IRMA to (i.e., whether AP 110 is known to STA 120). If yes, then step 1110 is followed by step 1112, where STA 120 selects the 96 bit IRMA that it used with AP 110 in its last association. STA 120 may store a list of APs and IRMAs in memory 722 and IRM unit 723 may be configured to search through that list to determine if AP 110 and an associated IRMA is present.

If, at step 1110, STA 120 determines that AP 110 is an AP that STA 120 has not previously associated to and has not previously provided a 96 bit IRMA to, then at step 1120, STA 120 creates a 96 bit IRMA that is used as an identifier for STA 120 with AP 110. For example, STA 120 may store a list of APs and IRMAs in memory 722 and IRM unit 723 may be configured to search through that list to determine that a 96 bit IRMA for AP 110 is not present. The new 96 bit IRMA may be created by IRM unit 723.

Steps 1112 or 1120 are followed by step 1125, where STA 120 sends an Association Request frame to AP 110 using the first 48 bits of the 96 bit IRMA. In some examples, the Association Request frame follows an authentication or a FILS authentication. The Association Request frame may be constructed by processing circuitry 720 and then transmitted via RF transmitter 711 and antenna assembly 714. At step 1130, AP 110 receives an Association Request frame from STA 120 and checks through its list of 96 bit IRMAs and STAs in order to find a stored 96 bit IRMA where the first 48 bits match the TA 216 in the Association Request frame. If a match is found, then at step 1132, AP 110 has identified or recognized STA 120. IRM unit 823 in processing circuitry 820 may be configured to search a list of 96 bit IRMAs, checking the first 48 bits and STAs stored in memory 822. At step 1134, STA 120 continues to associate with AP 110 and includes an IRMA KDE 500 that includes a new 96 bit IRMA field 505 in Message 2 402 or Message 4 404 of the four-way handshake of FIG. 4. If using FILS authentication, STA 120 includes an IRM element 600 that includes a new 96 bit IRMA field 604 in the FILS Association Request. At step 1136, AP 110 stores the new 96 bit IRMA, received at step 934, in memory module 822. AP 110 may store the first 48 bits and the last 48 bits separately so as to simplify the search. If at step 1130, AP 110 checks through its list of IRMAs and STAs and does not find a stored IRMA where the first 48 bits match TA 216 in the Association Request frame, then the process advances to step 1134. At step 1133, AP 110 may, after step 1130, send a response to STA 120 informing it that it has been identified or not. This response may be sent in Message 3 403, or the Association Response frame if FILS is being used. After step 1136, the method advances to FIG. 12 step 1201.

While connected, at step 1201, AP 110 and STA 120 may exchange packets. If this is the first time STA 120 has associated with AP 110, as determined at step 1130, then STA 120 transmits packets to AP 110 using the TA 216 that STA 120 associated with, and AP 110 transmits packets to STA 120 using as RA 215, the TA 216 that STA 120 associated with. If AP 110 has identified, at step 1130, a 96 bit IRMA for STA 120, then STA 120 transmits packets to AP 110 using a TA 216 equal to the first 48 bits of the IRMA, and AP 110 transmits packets to STA 120 using the second 48 bits of the IRMA as RA 215. Response control packets, however, use RA 215 equal to TA 216 of the related received packet. The 96 bit IRMA is the IRMA provided by STA 120 at the last association.

At step 1205, STA 120 decides whether to rotate its MAC address. Such a decision may be based upon a number or combination of criteria such as: elapsed time since association or last MAC address rotation, local device traffic and usage, and/or network traffic and loading. In the case that this is the first time that STA 120 has associated with AP 110, then STA 120 may make the decision to provide a 96 bit IRMA such that the TA and RA addresses can be different. In some examples, the IRM unit 723 in processing circuitry 720 includes a program/algorithm for this decision to rotate the MAC addresses. If the STA 120 is not ready to rotate the MAC addresses, then at step 1206, it checks whether to remain connected to the AP 110. If it decides to disconnect, then at step 1208, it does so, and the method returns to FIG. 11 step 1101. This disconnection may simply be that the STA 120 has drifted outside the coverage area of AP 110 as determined by RF receiver 712. In the general sense, STA 120 will stay connected, and at step 1201, STA 120 and AP 110 remain connected and exchanging packets and STA 120. At step 1205, STA 120 checks, at some predetermined interval, whether the conditions are right for the STA 120 to enact a MAC address rotation under the control of IRM unit 723 in processing circuitry 720.

If, at step 1205, STA 120 decides to change or rotate the MAC addresses, then at step 1210, a new 96 bit IRMA is created. STA 120 may, so as to improve the privacy of STA 120, change the complete 96 bit IRMA. In some examples, the STA 120 changed just the first 48 bits or the second 48 bits of the 96 bit IRMA. The new IRMA may be created by IRM unit 723. At step 1212, STA 120 performs an association with AP 110 using the first 48 bits of the 96 bit IRMA that was provided to AP 110 at step 1134. Hence, AP 110 identifies STA 120 and knows that it is the same STA. If using the four-way handshake, as discussed above with reference to FIG. 4, the new 96 bit IRMA, created in step 1010 is contained in the IRM KDE 500 and transmitted to AP 110 in Message 4 404. It should be appreciated that the IRM KDE 500 may alternatively be transmitted in Message 2 402. In some examples, the decision as to which Message to use, 2 or 4, is a standardization/interoperability decision. If using FILS authentication, then the new 96 bit IRMA is contained in the IRM element and transmitted to AP 110 in the Association Request frame. The association procedure is carried out by the RF transmitter 711 and RF receiver 712 in STA 120 and by the RF receiver 812 and RF transmitter 811 in AP 110, as controlled by the respective processing circuitries 720 and 820. At step 1215, similar to step 1136, AP 110 stores the new 96 bit IRMA, provided by STA 120 in step 1212, in memory module 822. The method then returns to step 1205.

In the method 1100 discussed above with reference to FIGS. 11 and 12, both STA 120 and AP 110 advertise that they support IRM dual capability, and STA 120 initially associates to AP 110 using a random MAC address as its TA 216. During that initial association, STA 120 provides a 96 bit IRMA to AP 110 and AP 110 stores the 96 bits as an identifier for STA 120. Once connected, STA 120 and AP 110 exchange packets in the standard manner using the random MAC address that STA 120 associated with (e.g., with both the TA 216 and RA 215 equal to the random MAC address). At a certain time, that is decided by STA 120, STA 120 again initiates an association to AP 110. In that association, STA 120 uses the first 48 bits of the 96 bit IRMA that was provided at the last association as its TA such that AP 110 recognizes STA 120 and knows it is the same STA. STA 120 may decide to initiate a new association several times while it is connected to AP 110, each time using the first 48 bits of the 96 bit IRMA provided at the previous association as its TA and providing a new 96 bit IRMA during the association. Rather than replacing both 48 addresses with two new 48 bit random addresses, STA 120 may replace only the first 48 bits with a new 48 bit random address, or replace only the second 48 bits with a new 48 bit random address so as to further confuse a listener. Once connected, STA 120 transmits packets to AP 110 using the first 48 bits of the 96 bit IRMA provided at the previous association as its TA 216, and AP 110 transmits packets to STA 110 using the second 48 bits of the 96 bit IRMA provided at the previous association as the RA 215. Control packets (e.g., ACK, CTS, BA), however, are sent with the RA 215 equal to the TA 216 of the packet that was received. Hence, in the general case that several STAs are connected to AP 110, a listener would observe many STAs associating at random times, all with different MAC addresses and in addition packets being exchanged with numerous TAs 216 and RAs 215. In such a scenario, a listener would be unable to distinguish which STA is which, hence increasing the privacy for each STA that is using this IRM dual method. As STA 120 is recognized by AP 110, the information elements (IEs) in the Association Request frame may be kept to a minimum such that STA 120 is not providing details that may be used by a listener to identify the STA. For example, in the initial association, STA 120 may include a vender specific IE, but on subsequent associations, this may be omitted.

In some examples, the IRMA fields 505 and 604 in the IRM KDE 500 and IRM element 600, respectively, may comprise two 48 fields (e.g., IRMA TA and IRMA RA), rather than a single 96 bit field. In either case, AP 110 and STA 120 may store the two 48 bit addresses separately. In some examples, separate storage of the two 48 bit address makes the identification of the STA 120 simpler on association (i.e., the 48 bit TA 216 is used).

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for example: the details of the frame formats, the nomenclature used for fields in the frames, the order of the steps in the methods 900 and 1100, the determination of the instance of when to rotate the MAC address(es) and provide a new IRMA, using the first or second 48 bits of a 96 IRMA as the STA TA, using the first or second 48 bits of a 96 IRMA as the STA RA, having one 96 bit or two 48 bit IRMA fields in the IRM KDE or IRM element. Accordingly, the scope should be determined not by the embodiments illustrated, but by the claims and their legal equivalents.

Some Embodiments

Some embodiments may include any of the following:

A1. A method for operating a mobile station (STA) to periodically change its medium access control (MAC) address includes transmitting, from a STA, a first capability indication to an access point (AP), the first capability indication indicating that the STA supports identifiable random MAC (IRM); receiving, at the STA, a second capability indication from the AP, the second capability indication indicating that the AP supports IRM; determining a first IRM address (IRMA); and establishing a first association between the STA and the AP using the first IRMA. The method further includes determining whether to change a MAC address of the STA; and in response to a determination to change the MAC address of the STA, without disconnecting from the AP: determining a second IRMA; establishing a second association between the STA and the AP using the first IRMA; and during the second association, transmitting the second IRMA from the STA to the AP.

A2. The method of clause A1 can include any of the following components or features, in any combination. Determining the first IRMA includes determining whether the AP is known to the STA. In response to a determination that the AP is unknown to the STA, creating a new IRMA to be used as the first IRMA. In response to a determination that the AP is known to the STA, retrieving a previously used IRMA to be used as the first IRMA. Determining the second IRMA includes creating a new IRMA to be used as the second IRMA, the second IRMA being different than the first IRMA. Determining whether to change the MAC address of the STA includes determining whether a predetermined time period has elapsed. Determining whether to change the MAC address of the STA includes determining whether traffic flow associated with the STA is in an interruptible state. Establishing each of the first and second associations between the STA and AP using the first IRMA includes transmitting an association request frame from the STA to the AP having a transmit address set to the first IRMA. A first association request frame associated with the first association includes a first plurality of information elements and a second association request frame includes a second plurality of information elements. The second plurality of information elements has fewer information elements than the first plurality of information elements. Establishing each of the first and second associations between the STA and AP includes transmitting at least one message from the STA to the AP as part of a handshake arrangement. Transmitting the second IRMA from the STA to the AP includes inserting the second IRMA in at least one of the messages transmitted from the STA to the AP as part of the handshake arrangement. The handshake arrangement corresponds to a robust secure network association (RSNA).

A3. A mobile station (STA) configured to periodically change its medium access control (MAC) address includes at least one memory device with computer-executable instructions stored thereon. The computer-executable instructions, when executed by at least one processor, cause the at least one processor to perform operations that include transmitting a first capability indication to an access point (AP), the first capability indication indicating that the STA supports identifiable random MAC (IRM); receiving a second capability indication from the AP, the second capability indication indicating that the AP supports IRM; determining a first IRM address (IRMA); and establishing a first association between the STA and the AP using the first IRMA. The operations further include determining whether to change a MAC address of the STA; and in response to a determination to change the MAC address of the STA, without disconnecting from the AP: determining a second IRMA; establishing a second association between the STA and the AP using the first IRMA; and during the second association, transmitting the second IRMA from the STA to the AP.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method for operating a mobile station (STA) to periodically change its medium access control (MAC) address to increase privacy when associated to an Access Point (AP), the method comprising:
    transmitting, from a STA, a first capability indication to an access point (AP), the first capability indication indicating that the STA supports identifiable random MAC (IRM);
    receiving, at the STA, a second capability indication from the AP, the second capability indication indicating that the AP supports IRM;
    determining, at the STA, a first IRM address (IRMA); and
    establishing a first association between the STA and the AP using a first random MAC address, wherein during the first association:
        transmitting to the AP the first IRMA;
        determining whether to change the first random MAC address of the STA;
        in response to determining to change the first random MAC address of the STA, determining, without disconnecting from the AP, a second IRMA different from the first IRMA; and
        establishing a second association between the STA and the AP using the first IRMA.

2. The method of claim 1, wherein determining the first random MAC address comprises determining whether the STA has previously associated to the AP and whether the AP is known to the STA;
    in response to determining that the AP is unknown to the STA, creating a random MAC address as the first random MAC address; and
    in response to determining that the AP is known to the STA, using an IRMA that was last transmitted from the STA to the AP during a previous association as the first random MAC address.

3. The method of claim 1, wherein the first and second IRMAs are transmitted to the AP in a key data encapsulation (KDE) field in one of a second message or a fourth message of a four-way handshake process, wherein the handshake process corresponds to a robust secure network association (RSNA).

4. The method of claim 1, wherein, in a fast initial link setup (FILS), the first IRMA is transmitted to the AP in an information element in an Association Request after an authentication.

5. The method of claim 1, wherein determining whether to change the first random MAC address of the STA comprises determining whether traffic flow associated with the STA is in an interruptible state.

6. The method of claim 1, wherein the first IRMA comprises 96 bits with first 48 bits being used as a transmit address (TA) for the STA and last 48 bits being used as a receiver address (RA) of the STA.

7. The method of claim 6, wherein the STA transmits packets, other than Control packets, to the AP using the first 48 bits of the 96-bit first IRMA as the TA and the second 48 bits of the 96-bit first IRMA as the RA, and wherein the AP and STA transmit Control packets using the TA of received packets as an RA.

8. The method of claim 6, wherein the method further comprises:
    transmitting a third capability indication to the AP, the third capability indication indicating that the STA supports 96-bit identifiable random MAC (IRM); and
    receiving a fourth capability indication from the AP, the fourth capability indication indicating that the AP supports 96-bit IRM.

9. The method of claim 6, wherein in a new 96-bit IRMA comprising first 48 bits and second 48 bits, only the first 48 bits are replaced with a new 48-bit first random MAC address or only the second 48 bits are replaced by a new 48-bit first random MAC address.

10. The method of claim 1, wherein during the second association, transmitting the second IRMA from the STA to the AP.

11. A mobile station (STA) configured to periodically change its medium access control (MAC) address in order to increase privacy when associated to an Access Point (AP), the STA comprising:
    at least one memory device with computer-executable instructions stored thereon; and
    at least one processor for executing the computer-executable instructions stored on the at least one memory device, wherein execution of the computer-executable instructions by the at least one processor causes the at least one processor to perform operations comprising:
        transmitting a first capability indication to an access point (AP), the first capability indication indicating that the STA supports identifiable random MAC (IRM);
        receiving a second capability indication from the AP, the second capability indication indicating that the AP supports IRM;
        determining a first IRM address (IRMA); and establishing a first association between the STA and the AP using a random MAC address, wherein during the first association:
  transmitting to the AP the first IRMA;
  determining whether to change the random MAC address of the STA;
  in response to determining to change the random MAC address of the STA, determining, without disconnecting from the AP, a second IRMA different from the first IRMA; and
  establishing a second association between the STA and the AP using the first IRMA.

12. The STA of claim 11, wherein determining the random MAC address comprises:
  determining whether the STA has previously associated to the AP, and whether the AP is known to the STA;
  in response to determining that the AP is unknown to the STA, creating a first random MAC address as the random MAC address; and
  in response to determining that the AP is known to the STA, using an IRMA that was last transmitted from the STA to the AP during a previous association, as the random MAC address.

13. The STA of claim 11, wherein the first and second IRMAs are transmitted to the AP in a key data encapsulation (KDE) field in one of a second message or a fourth message of a four-way handshake process, wherein the handshake process corresponds to a robust secure network association (RSNA).

14. The STA of claim 11, wherein, in a fast initial link setup (FILS), the first IRMA is transmitted to the AP in an information element in an Association Request after an authentication.

15. The STA of claim 11, wherein determining whether to change the random MAC address of the STA comprises determining whether traffic flow associated with the STA is in an interruptible state.

16. The STA of claim 11, wherein the first IRMA comprises 96 bits with first 48 bits being used as a transmit address (TA) for the STA, and last 48 bits being used as a receiver address (RA) of the STA.

17. The STA of claim 16, wherein the STA transmits packets, other than Control packets, to the AP using the first 48 bits of the 96-bit first IRMA as the TA and the second 48 bits of the 96-bit first IRMA as the RA, and wherein the AP and STA transmit Control packets using the TA of received packets as an RA.

18. The STA of claim 16, wherein the method further comprises:
  transmitting a third capability indication to the AP, the third capability indication indicating that the STA supports 96-bit identifiable random MAC (IRM); and
  receiving a fourth capability indication from the AP, the fourth capability indication indicating that the AP supports 96-bit IRM.

19. The STA of claim 16, wherein in a new 96-bit IRMA comprising first 48 bits and second 48 bits, only the first 48 bits are replaced with a new 48-bit random MAC address or only the second 48 bits are replaced by a new 48-bit random MAC address.

20. The STA of claim 11, wherein during the second association, transmitting the second IRMA from the STA to the AP.

* * * * *